April 7, 1936.   V. GOUROV   2,036,691
ELECTROMUSICAL INSTRUMENT
Filed Sept. 19, 1933   5 Sheets-Sheet 1
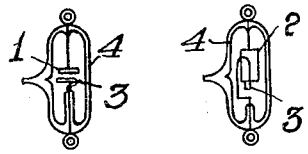
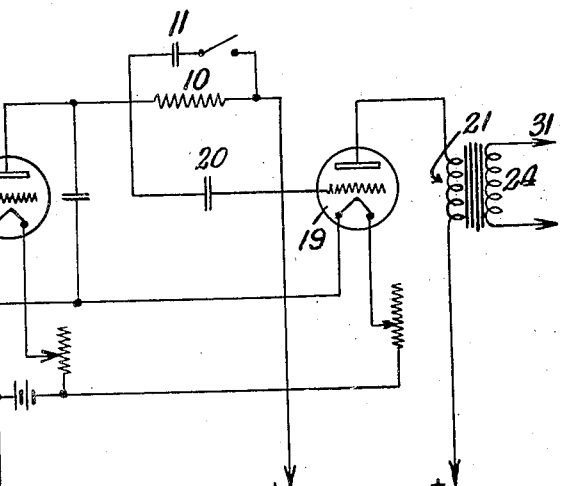
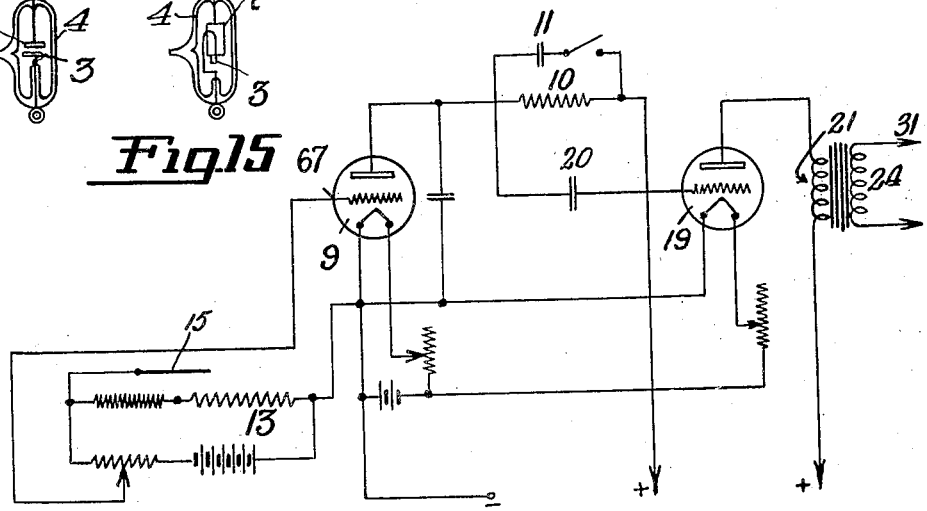
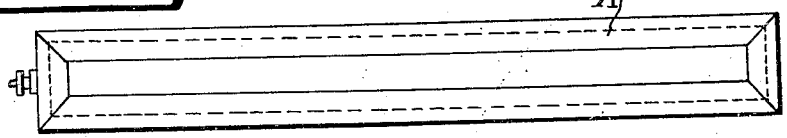
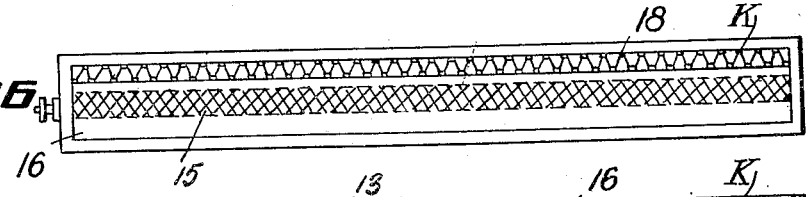
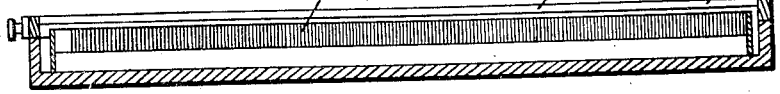
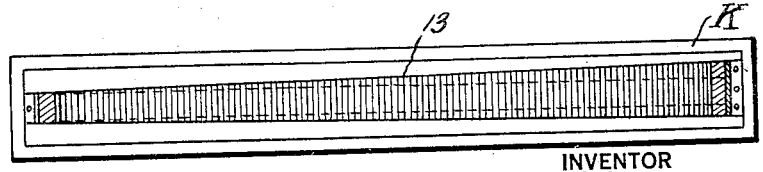
INVENTOR
V. GOUROV.
BY Herbert H. Thompson
HIS ATTORNEY.

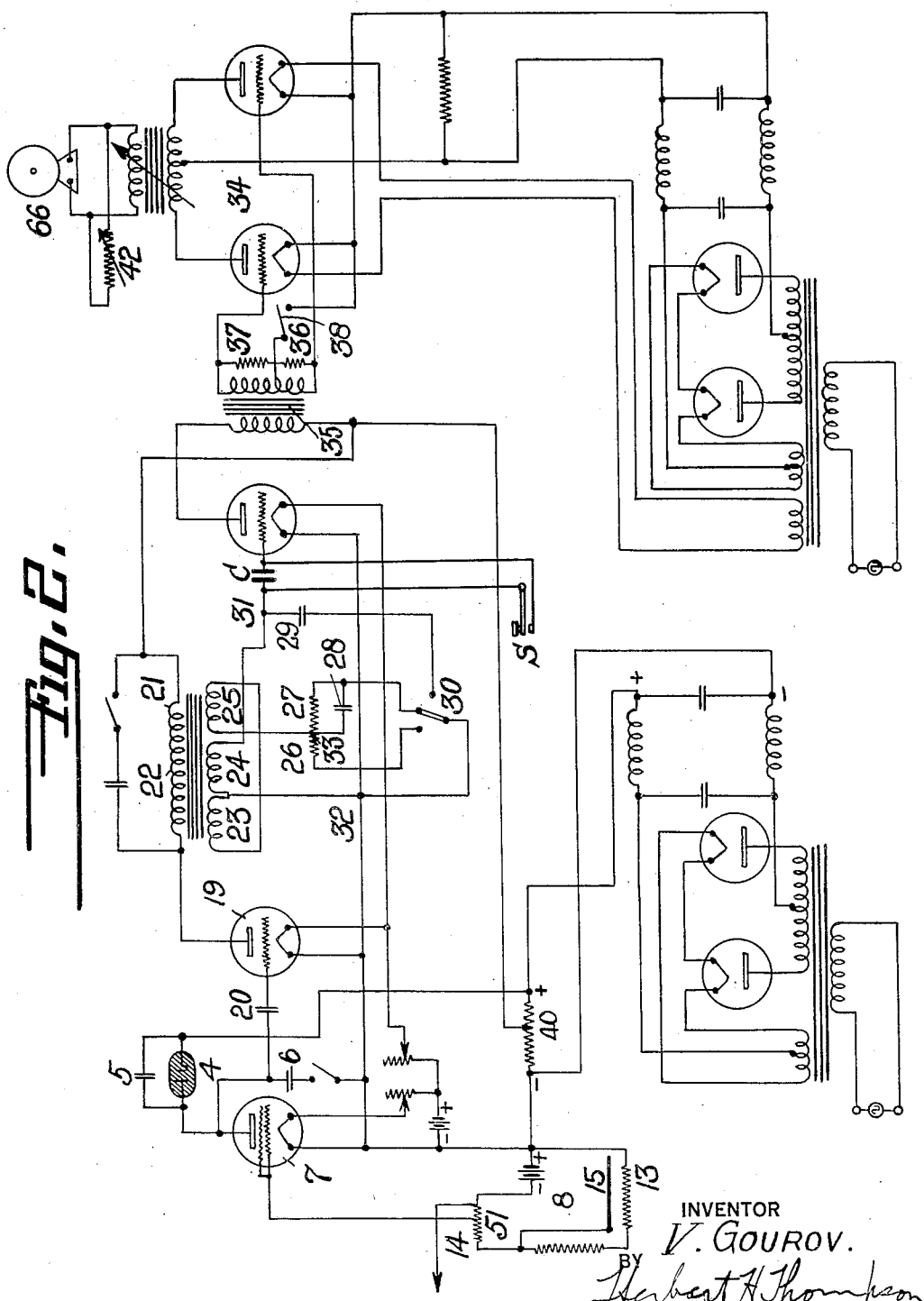

April 7, 1936.  V. GOUROV  2,036,691
ELECTROMUSICAL INSTRUMENT
Filed Sept. 19, 1933  5 Sheets-Sheet 3
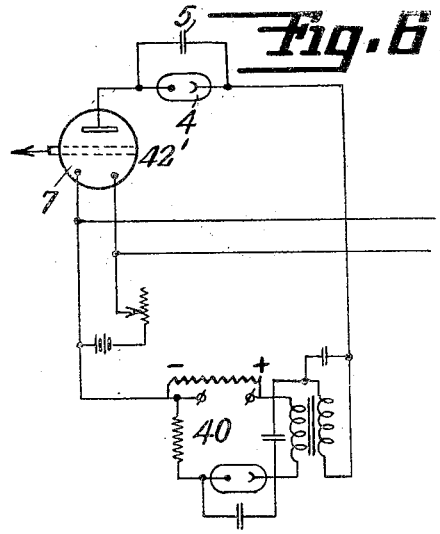
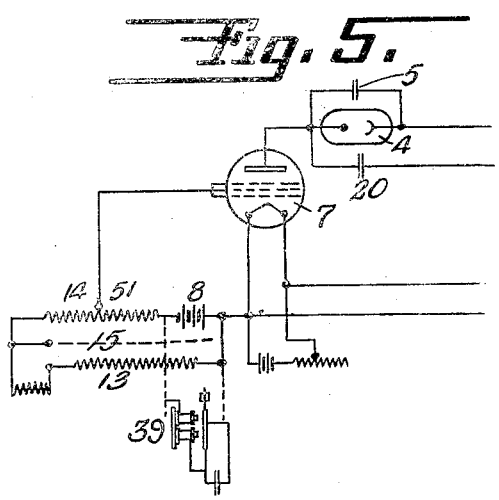
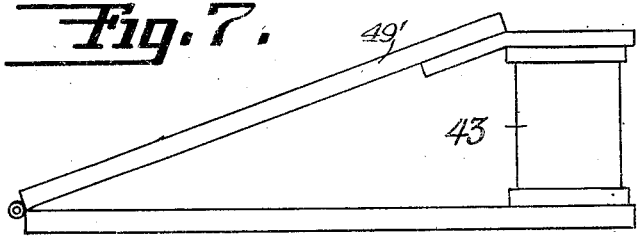
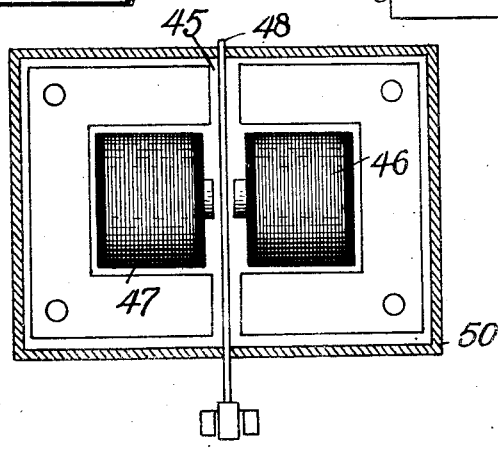
INVENTOR
V. GOUROV.
BY Herbert H. Thompson
HIS ATTORNEY April 7, 1936.　　　　V. GOUROV　　　　2,036,691
ELECTROMUSICAL INSTRUMENT
Filed Sept. 19, 1933　　5 Sheets-Sheet 4
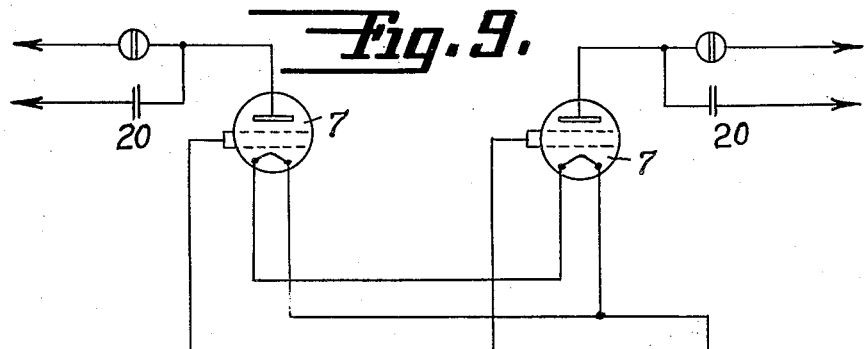
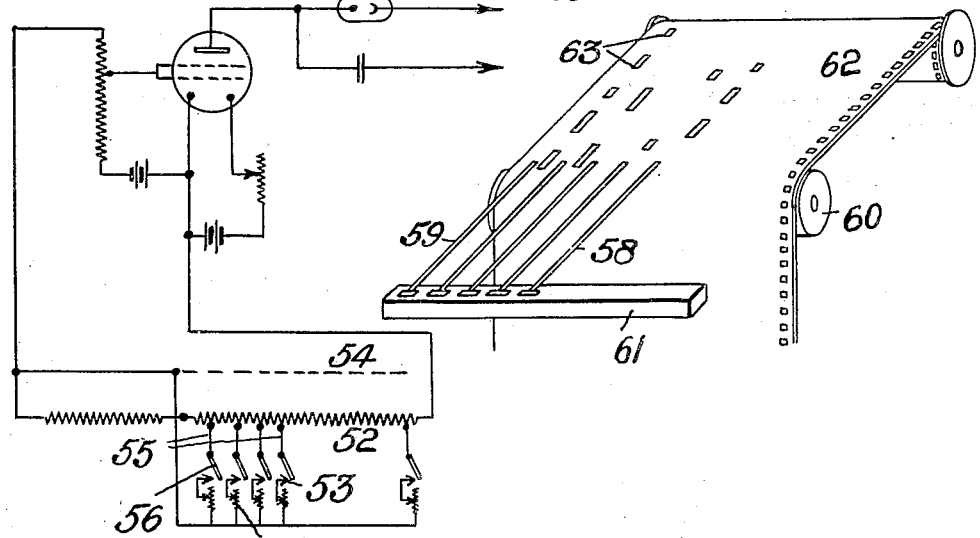
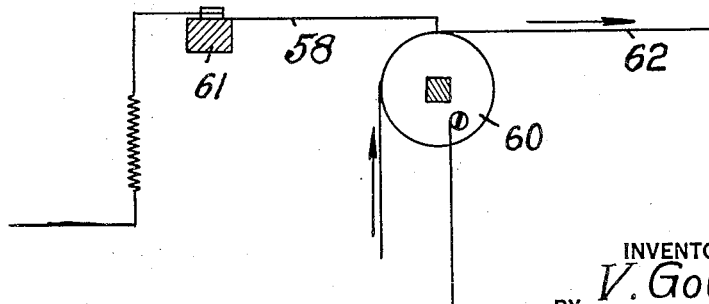
INVENTOR
V. GOUROV.
BY
HIS ATTORNEY April 7, 1936.  V. GOUROV  2,036,691

ELECTROMUSICAL INSTRUMENT

Filed Sept. 19, 1933  5 Sheets-Sheet 5

INVENTOR
V. GOUROV.
BY
Herbert H. Thompson
HIS ATTORNEY.

Patented Apr. 7, 1936

2,036,691

UNITED STATES PATENT OFFICE 2,036,691

ELECTROMUSICAL INSTRUMENT

Vladimir Gourov, Leningrad, Union of Soviet Socialist Republics

Application September 19, 1933, Serial No. 690,096

16 Claims. (Cl. 84—1)

This invention has as its object an electromusical instrument operating by the use of relaxation oscillations of current by the aid of a special gas discharger or thyratron.

The properties of relaxation oscillations received by means of glow tubes are already known as well as the use of such tubes in electric music, as is described in applicant's Soviet Patent application 6/X—1930, No. 77,298. Instruments of such a kind had the defect of an insufficient exactitude of sound, as the oscillating discharge in the neon lamps was not localized in one place but was shifted at the moment of ionization of the gas on the surface of the electrodes, wherefore the current in the circuit was not of the same amplitude and the frequency of the generator changed.

Referring to the drawings showing several forms of my invention,

Fig. 1 is a diagrammatic side view of one form of gas filled discharge tube used in my invention.

Fig. 2 is a wiring diagram illustrating the principal electrical elements of this invention.

Fig. 3 is a wiring diagram showing a somewhat modified arrangement wherein grid glow tubes are employed in lieu of vacuum tubes.

Fig. 4 is a plan view of one form of keyboard of the instrument.

Fig. 5 shows the use of a mechanical oscillation generator for reproducing organ music.

Fig. 6 shows an electrical oscillator for the same purpose.

Fig. 7 shows the method of controlling the volume of sound by foot pedal.

Fig. 8 shows a modified means for effecting volume control from the foot pedal by means of a magnetic screen.

Fig. 9 is a diagram of a modification showing how a two-voiced instrument may be constructed.

Fig. 10 is a diagram showing a modification for producing quick-time music with a double keyboard.

Figs. 11 and 12 illustrate how my invention may be employed with a mechanical reproducer, Fig. 11 being a perspective view of the perforated sheet and Fig. 12 a side view.

Fig. 15 illustrates a modified form of gas filled discharge tube.

Fig. 16 is a plan view of the keyboard of Fig. 4 with the cover removed.

Fig. 17 is a vertical sectional view of the keyboard of Fig. 4.

Fig. 18 is a transverse part sectional view of the keyboard shown in Fig. 4.

Fig. 19 is a sectional view of the means used for controlling the volume of sound by a foot pedal.

Fig. 20 is a side view of the volume control means of Fig. 8.

Figure 13:
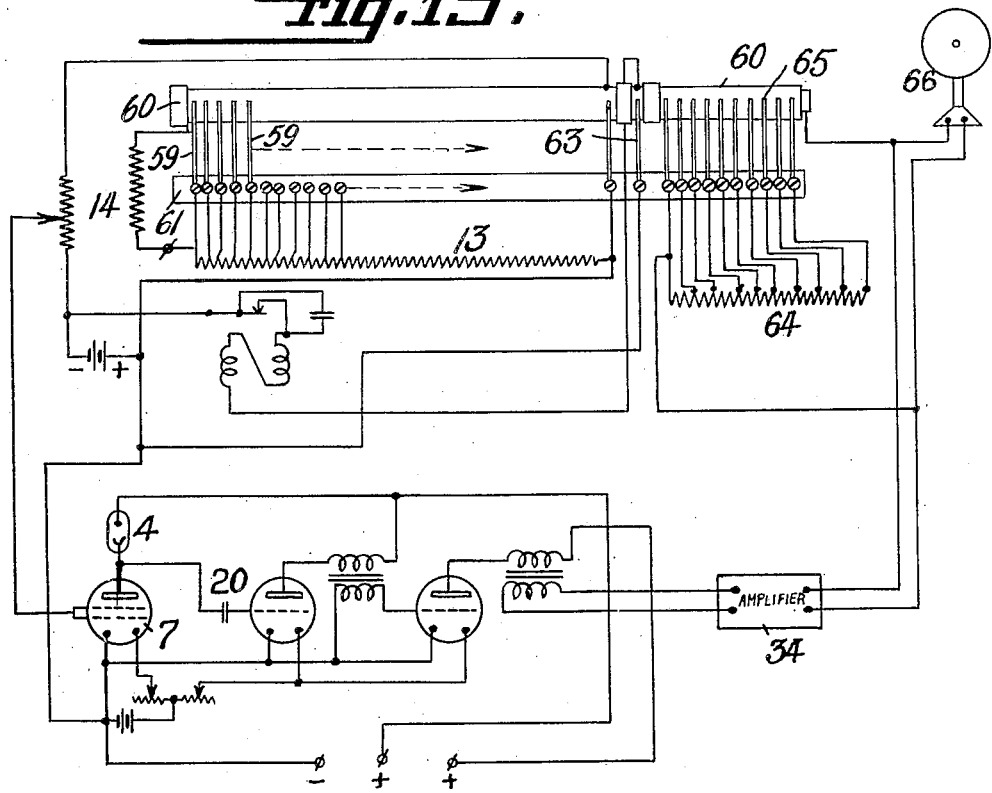
Fig. 13 is a more complete view showing the mechanical reproduction of music with the electrical circuits therefor.
Figure 14:
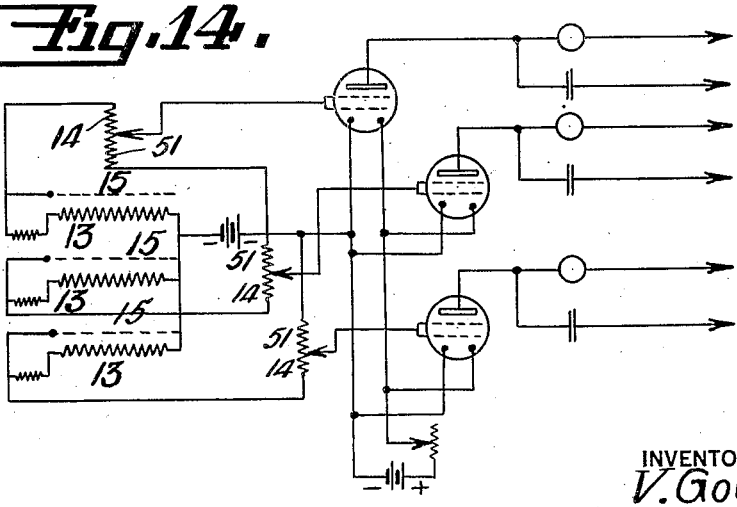
Fig. 14 shows certain modifications thereof.

In this instrument a special discharger (Fig. 1) filled with helium, with neon or with some other gas, is suggested, the electrodes of this discharger having such dimensions and shape that the discharge cannot shift on the surface and the amplitude of oscillations and, therefore, the frequency remain constant.

For this purpose the negative electrode 1 is designed in the shape of a small disc of 4 to 5 mm. in diameter, covered in the lower part by mica or in that of a rectangular plate 2, 3 x 5 mm. The positive electrode is made in the shape of a wire loop 3, as in large lamps for television, so that the discharge takes place partly in the positive column of ionization. The distance between the electrodes is about 2½ mm.

Owing to the small dimensions of the electrodes, the discharge is always in the same place and as the current does not exceed 30–40 mA. the heating of the gas is insignificant and all conditions for constancy of discharge are observed.

In order to produce relaxation oscillations (Fig. 2), such a discharger 4 is connected in series with a large resistance, and parallel to the discharger or parallel to the resistance, and sometimes together, are connected the condensers 5, 6 whose size depends upon the frequency of oscillations to be generated. In order to change the frequency of oscillations and with them the pitch of sound, it has already been suggested (in applicant's Soviet patent application No. 77,298) to use for the constant resistance a vacuum tube 7 with a grid which receives a certain negative potential. The value of the grid's potential can be changed by a potentiometer 14 and within certain limits, an even change of the anode resistance of the tube may be received. At the same time the frequency of generating will change. But for musical purposes the anode resistance of such a tube must change in wide limits. Therefore, in the present invention it is suggested to use a vacuum tube 7 with many grids (Fig. 5), two or three, which all join together and serve as if one space control electrode, giving to the characteristic of the tube a great steepness and considerably augmenting its rectilinear part. In practice, in the constructed mode, I use any screen-grid tube with two grids e. g. "screen-grid"—UX—222 or a pentode (with three grids). The application of the described scheme, with a special gas discharger gives a complete stability of oscillations, but these oscillations are very weak and require amplification. It is possible to produce at once considerably more powerful oscillations by applying thyratrons (Fig. 3) for the relaxation scheme. According to my scheme the thyratron 9 or grid glow tube is connected in series with some greater resistance 10 shunted by the condenser 11. With the change of the grid potential of the thyratron, a change of its frequency takes place and this scheme may be directly used for the receipt of currents used for the working of a loud-speaker. By connecting the condensers to the thyratron 9, it is possible to change the initial limit of generating and thus receive a wide diapason of sounds. The charge of condenser 11 of thyratron 9 (Fig. 3) which takes place through resistance 10 is limited by the potential of ignition $V_1$ of thyratron 9, which depends on the potential of its grid 67. After the ignition of the thyratron, condenser 11 is discharged and its potential very quickly falls to value $V_2$. The frequency of relaxation oscillations thus obtained depends on the potential of grid 67, and may change by the aid of this grid's potential. The variable difference of potentials arising on the plates of condenser 11 is passed to the grid of the amplifying tube 19 by condenser 20. To the anode circuit of tube 19 transformer 22 is connected, which may have one or several secondary windings. In Fig. 3 a simple transformer 22—24 is shown, so Fig. 3 principally explains the application of a thyratron as a generator of alternating current of musical frequency, and in Fig. 2 in the anode circuit a complicated transformer 22—23—24 is shown, having several windings for the obtaining of various timbres in sound. But in principle, the role of transformer 22—24 (Fig. 3) and that of transformer 22—23—24 (Fig. 2) is the same, namely, the transmission of the alternating potential to the grids of tubes of further amplification. Therefore Fig. 3 is the substitute of the initial part of Fig. 2 up to transformer 22. If in the scheme of Fig. 3 a sufficiently powerful thyratron is applied, transformer 22—24 can feed the loud speaker 66 (Fig. 2) directly, with its pedal 42, but in such a case the instrument has only one timbre.

The pitch control is attained, as was already mentioned, by changing the grids' potential of the controlling tube 7 (Fig. 2) or of the thyratron 9 (Fig. 3) itself by the aid of a special potentiometer. This potentiometer 8, Fig. 2, presents, according to the drawings, a closed electric circuit in which the current is changed by short circuiting of one of its parts by the so-called key-board 13. For receiving equidistant spacing of sounds on the keyboard, this part of the rheostat may have a complicated shape e. g. according to the scheme of artificial notes. That is, the change of resistance of rheostat 13 connected in circuit with the grid 8 of the controlling tube 7 (Fig. 2) or thyratron 9 (Fig. 3) follows the law that between equal musical intervals are equal distances. If the potential of the tube or thyratron is changed, for example, according to logarithmic function, then equal distances on the keyboard correspond to the sounds of the natural scale, as the frequency of relaxation oscillations is expressed by $$f = \frac{1}{RC \log \frac{V_0 - V_2}{V_0 - V_1}}$$

i. e., also by a logarithmic function. Therefore, in order to produce equal distances between the sounds on the keyboard, it is expedient to give rheostat 13 the shape of a long key, or a more complex curve. The other part 14 of this circuit is connected between the grid and the filament of the controlling tube in such a manner that at the time, when there is no playing, the highest negative potential is applied to the grid, the internal resistance of the controlling tube is very high and there is no generating of oscillations. In connecting different parts of the resistance of the keyboard, the grids' potential becomes less and less negative and all audible frequencies of oscillations may be received. The potential of the grid of tube 7 (Fig. 2) or of the grid of thyratron 9 (Fig. 3) may be presented by the following formula (see Fig. 5):

$$Vg = (E_s - R_{51} \cdot i)$$

where $Vg$ is the potential of grid,
$E_s$—E. M. F. battery 8,
$R_{51}$—resistance 51 (Fig. 2),
$i$—the direct current in the circuit of the keyboard, when ribbon 15 is not pressed.

The $$i = \frac{E_s}{R_{51} + R_{13}' + R_{13}}$$

whence $$V_\theta = -E_s\left(1 - \frac{R_{51}}{R_{51} + R_{13}' + R_{13}}\right)$$

In playing, the finger presses ribbon 15 and immediately short circuits resistance $R_{13}'$ (which is considerably greater than $R_{51} + R_{13}$) and part of resistance 13 and the potential of grid becomes:

$$V_\theta = -E_s\left(1 - \frac{R_{51}}{R_{51} + \Delta R_{13}}\right)$$

from which it is clear that playing on such a keyboard consists in the decrease of absolute value of the potential of the grid of tube 7 (Fig. 2) or of thyratron 9 (Fig. 3) by changing the fraction $$\frac{R_{51}}{R_{51} + \Delta R_{13}}$$

For the convenience of playing, the key-board K of the instrument (Fig. 4) is made in the shape of a long rheostat 13 having from 8 to 15 turns on 1 cm. of its length. Above this keyboard is stretched a silk ribbon 16 to which a contact braid 15 is sewn. It is important in pressing with the fingers that the ribbon should bend in the direction perpendicular to the direction of the rheostat itself as otherwise the connection will take place on a larger surface than that of the finger tip in consequence of which will occur the effect of prolonging the sound when raising the finger. Therefore, the ribbon is stretched by lacing 18 in the length in the direction perpendicular to the rheostat. At the ends, the ribbon 16 is fixed without stretching and, therefore, during pressure the contact has place only in the spot of touch. In my initial variants of the keyboard for an electromusical instrument (Soviet Patent No. 1091 of 1922), which was also a stringed rheostat in the form of a string of high resistance over a metal contact rule or of a copper string over the rheostat, was obtained the effect of prolongation of sound in passing from one pressure of the finger to another (playing "legato"), as the string did not instantaneously leave the contact rule along its length between the pressures. In order to avoid this, in the present apparatus the ribbon is stretched across by elastic threads. Thus, when pressing two fingers at once on a small distance, ribbon 15 gives a contact with rheostat 13 only under the fingers, and the part between the fingers remains raised above rheostat 13. If, in playing, one finger is raised, the contact is at once under the other finger and the second sound arises at once without any gliding effect or loss of artistic touch.

The oscillations received in such a manner and controlled in frequency by pressing the ribbon on the keyboard are augmented by a special amplifier in which steps are taken for the use of those wide possibilities for obtaining different timbres which result from the saw-tooth like shape of the relaxation curves of the current.

Between the anode of the controlling tube 7 (Fig. 2) and the grid of the first amplifying tube 19 is connected an intertube condenser 20. This condenser has a very small capacity (about 5–10 mmf.) and this tube 19 has no grid leak. Thus an extremely weak connection is realized between the amplifier and generator, at the same time a good amplifying is received, as the condenser in all oscillations becomes charged to a considerable potential. Absence of grid-leak permits the charge to remain a considerable time and does not cause interruption of the anode current from accumulation of electrodes on the grid as the condenser 20 is very small. The anode of the first amplifying tube 19 is connected with a transformer 21 with four windings, one of which 22 is the primary one (2000 turns) and the other three secondary ones 23, 24, 25. These secondary windings 23, 24, 25, serve for transmitting the potentials to the amplifying grid of the second stage, likewise for the changing of the shape of the amplifying current by connecting different kinds of impedance to them, 26 to 29, inclusive. A switch 30 serves both for connecting these impedances and for changing the timbres of sound. In the constructed model the following connections are made use of: (1) a condenser 29 between points 31 and 32,—(2) resistance 26 between 32, 33,—(3) resistance 27 of shunted condenser 28 in points 32, 33. The location of the resistance 27 is electrically between points 33 and 32 through switch 30 (Fig. 2). This inter-connecting gives the possibility of producing the sounds of almost all the instruments of an orchestra. If, between the grid of the amplifying tube and the end of the transformer, a large condenser C (2–4 mf.) is inserted by switch S, then in the presence of oscillations will occur an accumulation of electrons on the grid and a gradual weakening of amplification. The sound will have the character of a damped oscillation similar to those which are received from the vibration of strings. A short circuiting of such a condenser for a moment will evoke a sudden amplification of sound followed by its weakening which fully corresponds to the sound of string instruments of the type of a harp, guitar, etc.

The amplification is carried on further by another stage of amplification in push-pull 34, whose transformer 35 has shunts 36, 37 on the secondary winding and also a switch 38 between the middle point of this winding and the filament for producing a special jarring timbre. In order to receive an uninterrupted vibration of sound (Fig. 5) which accompanies the sound of an organ simultaneously with a change of potential in the grid of the controlling tube by playing on the keyboard, to this circuit is connected a mechanical vibrator 39 of the type of an electric bell which causes pulsations of the current in the keyboard. The same result may be received by the aid of a supplementary relaxation or cathode generator 40 (Fig. 6) which acts on the fundamental circuit of generating, impressing an additional voltage to the constant one applied to the system of the gas discharger 41 and the controlling tube 42'.

Control of the volume of sound is attained by any method adapted for this purpose in broadcasting. But the simplest of them is shunting the loudspeaker by variable resistance 42 placed in the foot pedal 49'. Such a resistance (Fig. 7) is made in the shape of a short rubber tube 43 filled with rounds of felt powdered with a mixture of carbon and sulphur. Another method is the change of magnetic coupling in the output transformer (Fig. 8) by placing into the gap between the coils of windings 46, 47 a screen plate 48 impermeable for magnetic lines such as copper. On Fig. 8 is shown the primary winding 46, the secondary winding 47 and in Fig. 20 the pedal 49, and the copper case of the transformer 50.

The instrument, described in detail in this patent application, is a one voiced instrument, but it can be adapted for producing multi-voiced music if one has several generators, amplifiers and loudspeakers controlled from one complicated system of keyboards. For the designing of such a device, it is suggested to adapt several keyboards placed directly one beside the other under one wide silk ribbon to which braids are sewn. The keyboards are divided by partitions onto which a wide ribbon falls wherever pressure be made. Thus the dropping of the ribbon does not cause false connections.

A two voiced instrument may be constructed with the simultaneous producing of two sounds on pressing the ribbon only in one spot (Fig. 9). For this purpose both generators working on the whole independently have separate controlling tubes 7 whose grids are connected to two different points of resistance 14 (Fig. 2). On pressing the ribbon one of the grids receives a greater potential than the other, the remaining parameters of the generator scheme being equal, two sounds are received at once, divided by a constant musical interval. Thus the play on one keyboard is expressed by parallel intervals of any correlation. The change of interval is achieved by the shifting of contact 51 on the resistance 14. This last contact may be realized in the shape of small keyboard for the left hand which will make the intervals. The scheme of such a keyboard is shown in Fig. 9.

Technical music in quick time is easier performed on mechanisms with keys. Therefore, in the instrument of my type a complicated keyboard is suggested (Fig. 10) having a keyboard and finger-board at the same time. This is realized according to the following scheme. In the same case the keyboard is a long rheostat 52 over which a contact ribbon 54 is stretched and besides, parallel to the ribbon, are arranged a row of keys of any shape. Each of these keys is a switch between the beginning of the contact ribbon 54 and one of the parts of the rheostat 52 from which outputs 55 are made. For the correction of exactitude of sound corresponding to the key, there are connected between the terminals 55 of the sections of the principal rheostat 52 and the contact of keys small variable resistances 57 by whose aid one may tune the whole claviary 53. Such a keyboard allows of performing the most complicated music, as all technical passages in quick movement may be executed on the finger-board 53 and the cantilena on the ribbon 54.

It follows as a matter of course that the adaptation of this keyboard permits the usage of all the properties of the instrument in relation to timbres and mechanical vibration, as described above.

An absolute stability of the order of sounds on the keyboard makes it possible to apply to our instrument mechanisms for automatic performance of musical compositions (Fig. 11). In the first approximation, such a mechanism may consist of a comb of springing contacts 58, 59 which touch the metallic roller 60. In a one voiced instrument, these contacts 58, 59 are isolated one from another, being on a common foundation 61 to which they are fixed. To the spring contacts are connected parts of the rheostat 13 of the keyboard (see Fig. 13).

Between the ends of the springs and the roller moves a paper ribbon 62 with holes of different length, depending upon the length of the sound which has to be reproduced. In passing the hole under the spring 59 the switching of the spring over the roller onto the rheostat 13 of the keyboard takes place; the grid of the controlling tube receives the potential as in usual playing on a keyboard and the instrument sounds.

The vibration of sound may be realized, as described above, mechanically or electrically and its connection may also be realized by switching a special spring 63 (Fig. 13) through special holes in the same ribbon. For the control of the volume of sound is used the shunting of a loudspeaker to a certain resistance 64 which is divided into 10 sections which are led out onto rings isolated from the common foundation on the same rheostat. There are 10 springs 65 above these rings which, when the holes in the ribbon pass under them, give one or another shunt of the loudspeaker 66 and, therefore, one or another loudness of sound.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. An electromusical instrument including a gas filled electron discharge tube having a plurality of non-symmetrical electrodes of very small size in one bulb, whereby the discharge does not change its place on one electrode, said electrode being connected in series with a source of current and with an electron tube having at least three electrodes and forming a variable resistance for generating oscillations of required frequency, and means comprising a potentiometer and playing keyboard means connected to said potentiometer for varying the potential on the grid of said tube for varying said frequency.

2. An electromusical instrument as claimed in claim 1, wherein the tube forming said variable resistance is of the screen grid type, the grids of which are connected together or separated and the proper potential is applied to them to obtain the proper internal resistance of said tube for generating oscillations of the required frequency.

3. The form of design of the electromusical instrument as described in claim 1 wherein said potentiometer is connected between the grid and filament of the controlling tube, a part of the resistance of which potentiometer is short circuited when playing by said keyboard means having a contact braid for causing such short circuiting.

4. The form of design of the keyboard for the electromusical instrument as described in claim 1, wherein said keyboard means is characterized by using a flat resistance over which a silk ribbon is stretched to which a contact braid is sewn, the stretching or lacing of the silk ribbon being in the direction perpendicular to that of the rheostat.

5. An electromusical instrument having a controlling thermionic tube, an input circuit therefor having a keyboard control means therein, amplifying stages connected to said controlling tube, means for weakening the influence of switching the keyboard control means, said means comprising a very small transmitting condenser between the anode of the controlling tube and the grid of the tube of the first amplifier stage, the grid of this last named tube having no leak.

6. The form of design of an electromusical instrument as described in claim 1, comprising impedances, a plurality of stages of amplification, said stages of amplification having a special transformer with four or more windings, one of which acts on the grid filament of the following stage and another is connected to said impedances in order to obtain the higher harmonies and shift of phases between them for obtaining different sound timbres.

7. The form of design of an electromusical device as described in claim 5, having a large condenser arranged to be switched into the grid circuit of one of the amplification stages for facilitating the reception of damped oscillations.

8. The form of design of an electromusical instrument as described in claim 5, characterized by using an electrical vibrator of the electric bell type for applying to the grid of the controlling tube pulsating potentials which imitate the vibrating sound of an organ.

9. An electromusical instrument, for the purpose of receiving a vibrating sound according to claim 1, which includes a supplementary generator of low frequency acting on the anode of the gas discharger of the generator.

10. In an electromusical instrument as described in claim 1, characterized in that for the receiving of multi-voiced music several generating systems with their amplifiers and loudspeakers are used and the control is made by one complicated keyboard of several resistances placed next to each other, being under one wide silk ribbon to which several braids are sewn.

11. In an electromusical instrument a keyboard having keys provided with contacts, a sectional resistance, and a silk ribbon provided with a contact braid overlying said resistance, the terminals of the sections of the keyboard resistance being connected to the contacts of the keys so that the claviary is placed in immediate nearness parallel to the ribbon of the keyboard, the circuit of each key being provided with an additional variable resistance allowing for the tuning of the claviary.

12. An electromusical instrument as described in claim 5, characterized in that for the control of the amplitude of sound a pedal is used in the shape of an output transformer with a gap which disconnects the magnetic circuit into which a copper plate is inserted, weakening the magnetic flux of the transformer.

13. An electromusical instrument as described in claim 1, characterized by the use of an automatic keyboard, consisting of contact springs resting on a metal roller, said springs being connected to the terminals of the sections of the keyboard's resistance causing a closing of the circuit of the keyboard when the ends of the springs get into the holes of the ribbon moving between the contact roller and the ends of the springs.

14. In an electromusical instrument, a three-electrode tube of the gas filled grid controlled type having an input circuit and an output circuit, said input circuit having a potentiometer therein and playing keyboard means connected with said potentiometer for varying the voltage across said potentiometer, whereby the grid potential of said tube is correspondingly varied.

15. In an electromusical, a three-electrode tube having an input circuit and an output circuit, said input circuit having a potentiometer therein and playing keyboard means connected with said potentiometer for varying the voltage across said potentiometer, whereby the grid potential of said tube is correspondingly varied, said output circuit having a two-electrode gaseous tube therein, said last named tube having non-symmetrical electrodes of relatively small size, whereby the output frequency of said three-electrode tube is substantially stabilized.

16. In an electromusical instrument, a three-electrode tube having an input circuit and an output circuit, said input circuit having a potentiometer therein and playing keyboard means connected with said potentiometer for varying the voltage across said potentiometer, whereby the grid potential of said tube is correspondingly varied, said output circuit having a two-electrode gaseous tube therein, said last named tube having non-symmetrical electrodes of relatively small size, whereby the output frequency of said three-electrode tube is substantially stabilized by its grid potential supplied by said potentiometer, said three-electrode tube being of the plural grid type so that a wide range of output frequencies are obtained from said tube, and means for amplifying the output of said three-electrode tube.

VLADIMIR GOUROV.